United States Patent [19]

Machado

[11] Patent Number: 5,734,442
[45] Date of Patent: Mar. 31, 1998

[54] MODULE INTERFACE SYSTEM FOR TELEVISION RECEIVER

[75] Inventor: Edward Machado, Northbrook, Ill.

[73] Assignee: Zenith Electronics Corporation, Glenview, Ill.

[21] Appl. No.: 510,251

[22] Filed: Aug. 2, 1995

[51] Int. Cl.⁶ .................................................. H04N 5/268
[52] U.S. Cl. ........................ 348/705; 348/565; 348/839; 455/348
[58] Field of Search ..................... 348/705, 706, 348/571, 565, 725, 731, 836, 839, 838, 553; 358/906, 909; 455/348, 349; H04N 5/268

[56] References Cited

U.S. PATENT DOCUMENTS

| | | | |
|---|---|---|---|
| 4,855,611 | 8/1989 | Isobi et al. | 348/706 |
| 4,949,179 | 8/1990 | Hosono | 348/706 |
| 5,170,262 | 12/1992 | Kinoshita et al. | 358/906 |
| 5,202,765 | 4/1993 | Lineberry | 348/706 |
| 5,285,265 | 2/1994 | Choi | 348/705 |

FOREIGN PATENT DOCUMENTS

| | | | |
|---|---|---|---|
| 2206758 | 1/1989 | United Kingdom | 348/725 |

*Primary Examiner*—John K. Peng
*Assistant Examiner*—Jeffrey S. Murrell

[57] ABSTRACT

A television chassis is arranged to receive a plug-in PIP module. When the PIP module is not installed, the composite video signal is passed through a chassis emitter follower interface circuit for video processing. The PIP module also includes an emitter follower interface circuit that supplies a composite video signal. When the PIP module is plugged in, it shares a bias resistor with the chassis emitter follower interface circuit and the PIP module interface circuit overrides the chassis interface circuit, thus passing the PIP module video signal for further video processing.

8 Claims, 1 Drawing Sheet

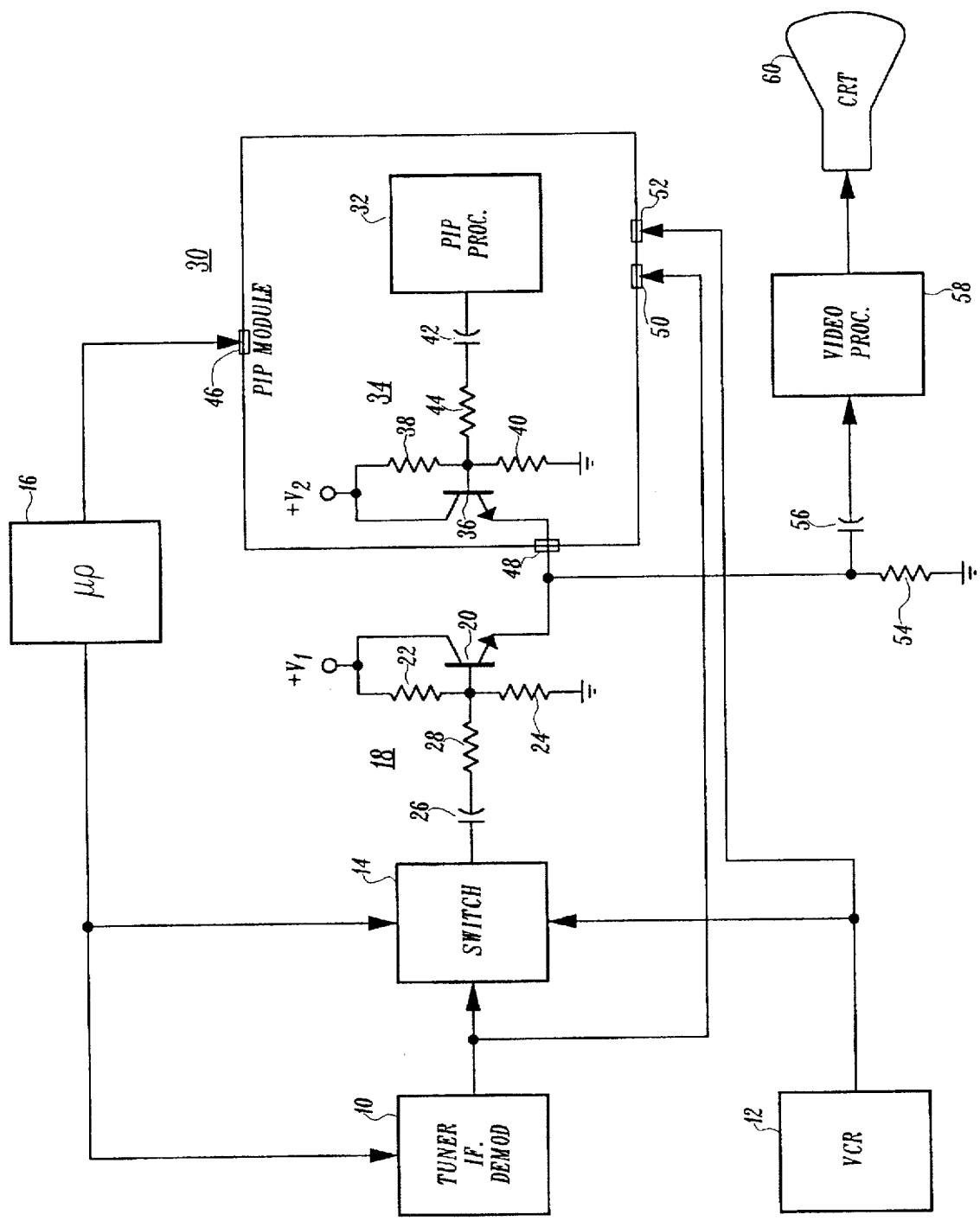

MODULE INTERFACE SYSTEM FOR TELEVISION RECEIVER

BACKGROUND OF THE INVENTION AND PRIOR ART

This invention relates in general to television receivers and specifically to television receivers that incorporate one or more modules for providing special functions or features.

It is common in modern television receivers to provide functions such as picture-in-picture (PIP), enhanced audio and other special features, as options. Current television receivers incorporate such modules on a wired basis. If a receiver model is assembled without a particular module, special interconnections are required for the receiver to operate without the module installed. This process requires added labor and is not cost effective.

While the present invention is not specifically limited to a television receiver incorporating a PIP module, the preferred embodiment of the invention includes a PIP module. In accordance with the invention, a PIP module is modified to be a plug-in device and the television receiver chassis requires no modifications for proper operation irrespective of the presence or absence of the plug-in module.

Objects of the Invention

A principal object of the invention is to provide a novel television receiver module system.

Another object of the invention is to provide an improved television receiver module system.

A further object of the invention is to provide a television receiver with a plug-in module that requires no chassis modifications for operation without the module.

BRIEF DESCRIPTION OF THE DRAWING

These and other objects and advantages of the invention will be apparent upon reading the following description in conjunction with the drawing, the single figure of which is a partial block, partial schematic diagram of a television receiver incorporating the invention.

DESCRIPTION OF THE PREFERRED EMBODIMENT

As mentioned briefly above, the television receiver that incorporates the invention includes a plug-in PIP module. The PIP feature is well known and requires a composite video signal from a source other than the television tuner. The signal from that external video source is displayed on a selected portion of the cathode ray tube viewing screen along with the main video signal. Most receivers that incorporate PIP and other features also include a microprocessor control which, via a suitable control bus, periodically interrogates certain functional blocks and modules in the television receiver chassis to determine whether they are present and, if so, to control their operation. In the case of a PIP module, polling by the microprocessor indicates whether the module is present in the receiver and if it is, the microprocessor arranges to switch the composite video signals (from the tuner and external sources) through the PIP processor and thence to the main video processor of the television receiver, in preference to the normal composite video produced. Thus the video processor of the television receiver has its inputs supplied from either the main chassis in the event there is no PIP module or from the PIP processing module.

Referring to FIG. 1, a tuner IF demodulator circuit 10 and a VCR source of video 12 are coupled to a switch 14 that is operated under control of a microprocessor 16. A first interface circuit 18 includes a transistor 20 that is used in the emitter follower configuration and has its base connected to the junction of a resistor 22 and a resistor 24 connected in series between a source of voltage +V1 and ground. For purposes of simplicity of description, transistors used in an emitter follower configuration will be referred to as emitter follower transistors. The composite video signal from switch 14 is supplied through a coupling capacitor 26 and a resistor 28 to the base of emitter follower transistor 20. The emitter of transistor 20 is connected to an emitter resistor 54. Microprocessor 16 also controls operation of a PIP module 30 that includes a PIP processor 32 and a second interface circuit 34. Interface circuit 34 includes an emitter follower resistor 36 having a base that is connected to the junction of a pair of resistors 38 and 40 serially connected between a source of voltage +V2 and ground. The composite video signal output of PIP processor 32 is supplied through a coupling capacitor 42 and a series resistor 44 to the base of emitter follower transistor 36. Emitter follower transistor 36 also has its emitter connected to resistor 54 and therefore the emitter follower circuits are commonly biased. The plug-in PIP module has a plurality of plug in terminals identified as terminals 46, 48, 50 and 52. Terminals 50 and 52 couple the respective composite video signals from the tuner IF demodulator 10 and VCR 12 to the PIP processor 32 as is well known.

The composite video signal developed across common bias resistor 54 is coupled through a capacitor 56 to a video processor circuit 58, the output of which drives a color cathode ray tube 60. The voltage +V1 and +V2 are not equal; +V1 is approximately 9 volts and +V2 is approximately 5 volts. When the plug-in PIP module 30 is not present, emitter follower transistor 20 provides the composite video signal that is developed across bias resistor 54. In operation without module 30 plugged in, the DC voltage developed at the emitter of transistor 20 is approximately 2 volts, which is its DC bias point. When module 30 is plugged in, the DC bias at the emitter of transistor 36 is about 4 volts, which is higher than the 2 volts emitter bias required by transistor 20. Consequently, transistor 20 is reverse biased which places it in a high impedance state and enables the composite video signal from transistor 36 to be supplied to video processor 58. There is a small amount of cross talk present. It has been determined that at 6 MHz the cross talk is below −33 dB. At that level, no visible evidence of the cross talk can be detected in the video display.

While those skilled in the art will appreciate that when module 30 is plugged into the receiver chassis, the microprocessor 16 determines that the module is present and controls the application of the tuner composite video signal and the VCR composite video signal present at plug-in terminals 50 and 52 by means of a switch (not shown) in PIP processor 32. The present invention is directed to the interface circuits in the PIP module and in the chassis which enable the module to be plugged in or removed without requiring any wiring changes or modifications. It will be appreciated that the PIP module is exemplary and is not to be considered limiting of the invention. The invention is to be limited only as set forth in the claims.

What is claimed is:

1. A method of operating a television receiver including an output circuit that receives an input signal from a wired chassis circuit or from an optional plug-in circuit module, adapted to be plugged into the wired chassis circuit, comprising:

supplying the signal from the wired chassis circuit to a chassis interface;

supplying the signal from the plug-in circuit module to a module interface; and electronically overriding the chassis interface with the module interface in response to the plug-in circuit module being plugged into the wired chassis.

2. The method of claim 1 wherein said interfaces comprise emitter follower circuits and further comprising;

providing a common bias arrangement for the emitter follower circuits.

3. A method of operating a television receiver having a video circuit supplied with a video signal from a chassis input and from an optional plug-in PIP module comprising:

supplying a video signal to the video circuit from the chassis input through an emitter follower circuit;

supplying a video signal to the video circuit from the plug-in module through an emitter follower circuit; and commonly biasing the emitter follower circuits such that the video signal from the plug-in module is selected over the video signal from the chassis input.

4. The method of claim 3 wherein all the video signals are AC coupled and wherein the common biasing of the emitter follower circuits is accomplished with a common emitter resistor.

5. A television receiver including a wired chassis comprising:

a television signal processing circuit;

a first interface on said wired chassis;

means for supplying a first input television signal to said television signal processing circuit through said first interface;

a plug-in circuit module having a second interface for coupling a second input television signal to said signal processing circuit; and means for electronically selecting said second input television signal over said first input television signal in response to said circuit module being plugged into said wired chassis.

6. The receiver of claim 5 wherein said first and said second interfaces include emitter follower transistors and wherein said selecting means comprises a common bias circuit for said emitter follower transistors.

7. A television receiver comprising:

a video processing circuit;

means for developing a first video input signal;

a first interface for coupling said first video input signal to said video processing circuit;

a plug-in PIP module having a second interface for coupling a second video input signal to said video processing circuit; and means for overriding said first interface when said plug in module is in place.

8. The receiver of claim 7 further including:

coupling means for AC coupling said first and said second video input signals;

an emitter follower transistor in each said interface; and a resistor for commonly biasing said emitter follower transistors.

* * * * *